(12) United States Patent
Kojima et al.

(10) Patent No.: US 7,178,506 B2
(45) Date of Patent: Feb. 20, 2007

(54) FUEL SUPPLY APPARATUS FOR INTERNAL COMBUSTION ENGINE

(75) Inventors: Susumu Kojima, Susono (JP); Terutoshi Tomoda, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 28 days.

(21) Appl. No.: 11/126,250

(22) Filed: May 11, 2005

(65) Prior Publication Data

US 2005/0268889 A1   Dec. 8, 2005

(30) Foreign Application Priority Data

May 17, 2004  (JP) .............................. 2004-146379

(51) Int. Cl.
*F02B 7/00* (2006.01)
*F02B 7/04* (2006.01)

(52) U.S. Cl. ...................................... 123/431; 123/456

(58) Field of Classification Search ................ 123/431, 123/302, 456, 514, 506, 457, 299, 300
See application file for complete search history.

(56) References Cited

U.S. PATENT DOCUMENTS

| | | | | |
|---|---|---|---|---|
| 3,824,965 A | * | 7/1974 | Clawson ..................... | 123/275 |
| 4,633,837 A | * | 1/1987 | Babitzka et al. ............. | 123/478 |
| 5,924,405 A | * | 7/1999 | Hashimoto ................... | 123/431 |
| 7,007,662 B2 | * | 3/2006 | Sakai et al. .................. | 123/299 |
| 7,013,872 B2 | * | 3/2006 | Yamazaki et al. ........... | 123/431 |
| 7,063,069 B2 | * | 6/2006 | Sakai et al. .................. | 123/431 |
| 2005/0072405 A1 | * | 4/2005 | Kojima et al. ............... | 123/446 |
| 2005/0098155 A1 | * | 5/2005 | Yamazaki et al. ........... | 123/431 |
| 2005/0193981 A1 | * | 9/2005 | Sakai et al. .................. | 123/431 |
| 2005/0193982 A1 | * | 9/2005 | Sakai et al. .................. | 123/431 |
| 2005/0241617 A1 | * | 11/2005 | Kojima ........................ | 123/446 |
| 2006/0000452 A1 | * | 1/2006 | Tokuda et al. ............... | 123/456 |
| 2006/0000455 A1 | * | 1/2006 | Kurata et al. ................ | 123/514 |
| 2006/0075992 A1 | * | 4/2006 | Akita et al. .................. | 123/431 |

FOREIGN PATENT DOCUMENTS

| | | |
|---|---|---|
| EP | 0 849 455 A2 | 6/1998 |
| EP | 1 030 048 A2 | 8/2000 |
| EP | 1 531 261 A1 | 5/2005 |
| JP | A 07-103048 | 4/1995 |
| JP | A 09-021369 | 1/1997 |
| JP | A 11-287148 | 10/1999 |

(Continued)

*Primary Examiner*—Mahmoud Gimie
(74) *Attorney, Agent, or Firm*—Oliff & Berridge PLC

(57) ABSTRACT

A low-pressure fuel supply system for applying pressure to a fuel by using a feed pump and supplying the fuel to a manifold fuel injection mechanism, and a high-pressure fuel supply system branched from the low-pressure fuel supply system and for applying pressure to the low-pressure fuel by using a high-pressure pump of a metering delivery type driven in accordance with the engine operation state and supplying the resultant fuel to an in-cylinder fuel injection mechanism are provided. The high-pressure pump supplies all the pressurized fuel to the high-pressure fuel supply system, irrespective of an actuation state of the in-cylinder fuel injection mechanism. Excessive fuel is returned when a relief valve is opened. Thus, pulsation caused by operation of the high-pressure pump is reduced, and the fuel can be supplied in a proper quantity.

14 Claims, 10 Drawing Sheets

FOREIGN PATENT DOCUMENTS

| | | |
|---|---|---|
| JP | A 2000-274329 | 10/2000 |
| JP | A 2001-027164 | 1/2001 |
| JP | A 2001-107789 | 4/2001 |
| JP | A 2001-336439 | 12/2001 |
| JP | A 2003-278624 | 10/2003 |

* cited by examiner

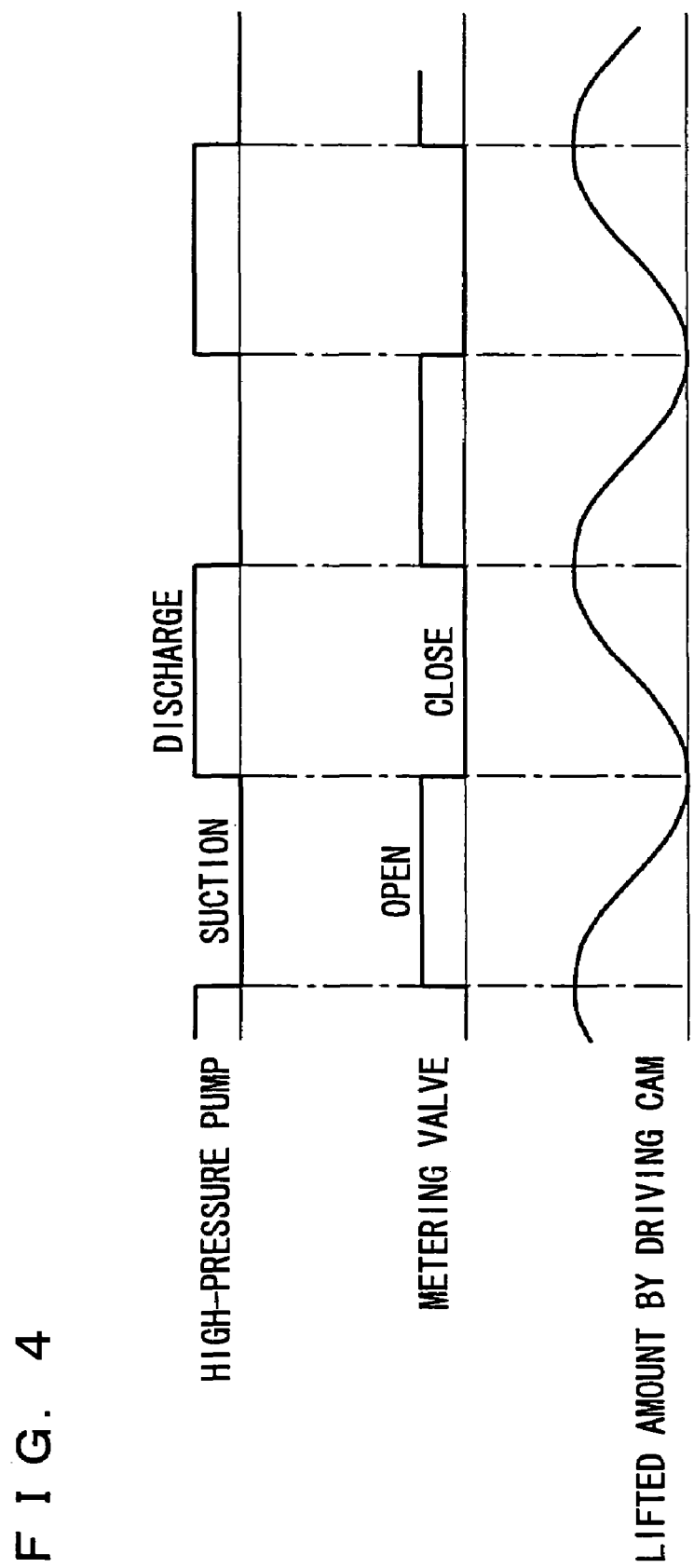

FUEL SUPPLY APPARATUS FOR INTERNAL COMBUSTION ENGINE

This nonprovisional application is based on Japanese Patent Application No. 2004-146279 filed with the Japan Patent Office on May 17, 2004, the entire contents of which are hereby incorporated by reference.

BACKGROUND OF THE INVENTION

1. Field of the Invention

The present invention relates to a fuel supply apparatus for an internal combustion engine, and more particularly to a fuel supply apparatus for an internal combustion engine having a first fuel supply system and a second fuel supply system for supplying a fuel to an internal combustion engine.

2. Description of the Background Art

Examples of a method of supplying a fuel to an internal combustion engine such as a gasoline engine and a diesel engine incorporated in a vehicle such as a truck or the like include in-cylinder injection for directly injecting the fuel into a cylinder of the internal combustion engine, manifold injection for injecting the fuel into an intake manifold for taking air into the cylinder, and a combination thereof, that is, in-cylinder injection/manifold injection switching between in-cylinder injection and manifold injection in accordance with an operation state of the internal combustion engine.

For example, Japanese Patent Laying-Open No. 07-103048 discloses a fuel injection apparatus for an internal combustion engine carrying out in-cylinder injection/manifold injection in accordance with an operation state of the internal combustion engine. The fuel injection apparatus for the internal combustion engine includes a fuel supply apparatus, a first fuel injection mechanism having a manifold injector performing manifold injection (a fuel injection valve for injection into engine intake manifold), and a second fuel injection mechanism having an in-cylinder injector performing in-cylinder injection (a fuel injection valve for injection into cylinder). The fuel supply apparatus has a first fuel supply system that applies pressure to the fuel within a fuel tank by a low-pressure pump and supplies the fuel to the first fuel injection mechanism, and a second fuel supply system that further applies pressure to the fuel pressurized by the low-pressure pump by a high-pressure pump and supplies the resultant fuel to the second fuel injection mechanism. This fuel injection apparatus for the internal combustion engine controls injection of the first and second fuel injection mechanisms in accordance with a map prepared based on a fuel supply quantity (fuel injection quantity) and degree of accelerator press-down (an amount of press-down of an accelerator pedal). Specifically, the map is divided into an injection region where solely the first fuel injection mechanism is used, an injection region where both of the first and second fuel injection mechanisms are used, and an injection region where solely the second fuel injection mechanism is used. Then, control means controls the injection of the first and second fuel injection mechanisms in accordance with the operation state of the internal combustion engine.

In the conventional fuel injection apparatus for an internal combustion engine as described above, a high-pressure pump is provided for supplying a high-pressure fuel to the second fuel injection mechanism. The high-pressure pump applies pressure to the fuel in the following manner. A cam rotates in accordance with rotation of a crankshaft of the internal combustion engine. This causes reciprocating motion of a plunger of the high-pressure pump, so that further pressure is applied to the fuel having been pressurized by the low-pressure pump. The high-pressure pump continues to operate by rotation of the crankshaft of the internal combustion engine, even in the state where the control means controls not to inject the fuel from the in-cylinder injector, i.e., even in the state where the second fuel injection mechanism is not actuated. Consequently, pulsation occurs when the fuel is suctioned from the first fuel supply system by the high-pressure pump or when excessive fuel is returned. Such pulsation causes fluctuation in pressure of the fuel, i.e., fuel pressure, within the pipe of the first fuel supply system, and the fluctuation of the fuel pressure propagates to the first fuel injection mechanism. Although the control means controls injection timing and quantity of the fuel injected from the first fuel injection mechanism into the intake manifold of the internal combustion engine, the first fuel injection mechanism has not been able to inject the fuel of an injection supply quantity that is determined based on the operation state of the internal combustion engine, due to propagation of pulsation to the first fuel injection mechanism. When the fuel of a prescribed fuel supply quantity that should be supplied to the internal combustion engine cannot be supplied from the fuel injection apparatus, there will occur fluctuation of air-fuel ratio, leading to degradation in fuel efficiency and driving properties.

SUMMARY OF THE INVENTION

An object of the present invention is to provide a fuel supply apparatus for an internal combustion engine capable of supplying a fuel of a proper quantity by reducing pulsation caused by operation of a high-pressure pump.

A fuel supply apparatus for an internal combustion engine according to the present invention includes: a first fuel supply system for applying pressure to a fuel by using a low-pressure pump and supplying the fuel to a first fuel injection mechanism; a second fuel supply system branched from the first fuel supply system and for applying pressure to the fuel having been applied with pressure by the low-pressure pump by using a high-pressure pump of a metering delivery type driven in accordance with an operation state of the internal combustion engine and supplying the pressurized fuel to a second fuel injection mechanism; a control unit for controlling the high-pressure pump to supply the pressurized fuel of a prescribed quantity irrespective of an actuation state of the second fuel injection mechanism; and a relief valve for externally discharging excessive fuel in the second fuel supply system.

In the fuel supply apparatus for an internal combustion engine of the present invention, preferably, the high-pressure pump has a suction port for suctioning the fuel in the first fuel supply system, a plunger for applying pressure to the suctioned fuel, a discharge port for discharging the pressurized fuel to the second fuel injection mechanism, and a metering valve for opening/closing the suction port, and the control unit controls opening/closing of the metering valve such that all the fuel having been suctioned through the suction port is discharged through the discharge port.

In the fuel supply apparatus for an internal combustion engine of the present invention, preferably, the relief valve is a pressure regulation valve that is opened when a fuel pressure in the second fuel supply system is greater than an injection pressure of the second fuel injection mechanism, to externally discharge excessive fuel in the second fuel supply system.

In the fuel supply apparatus for an internal combustion engine of the present invention, preferably, the control unit controls the high-pressure pump to supply the pressurized fuel of a prescribed quantity irrespective of an actuation state of the second fuel injection mechanism in a specific operation region of the internal combustion engine, and controls the high-pressure pump to supply the pressurized fuel of a quantity in accordance with the actuation state of the second fuel injection mechanism in another operation region.

In the fuel supply apparatus for an internal combustion engine of the present invention, preferably, the specific operation region of the internal combustion engine is a medium engine speed and medium load operation region.

In the fuel supply apparatus for an internal combustion engine of the present invention, preferably, the relief valve is an electromagnetic relief valve, and the control unit controls opening/closing of the electromagnetic relief valve such that the fuel pressure in the second fuel supply system is maintained at a preset level.

In the fuel supply apparatus for an internal combustion engine of the present invention, preferably, a supply quantity of the pressurized fuel by the high-pressure pump is fixed to a preset value when the first and second fuel injection mechanisms are actuated.

According to the fuel supply apparatus for an internal combustion engine of the present invention, the first fuel supply system for supplying low-pressure fuel to the first fuel injection mechanism and the second fuel supply system for supplying high-pressure fuel to the second fuel injection mechanism by using the high-pressure pump of a metering delivery type are provided. The control unit controls the high-pressure pump to supply the pressurized fuel of a prescribed quantity irrespective of an actuation state of the second fuel injection mechanism, while excessive fuel is externally discharged via the relief valve. Since the high-pressure pump does not return the pressurized, high-pressure fuel back to the first fuel supply system, propagation of pulsation caused by operation of the high-pressure pump to the first fuel injection mechanism is suppressed, and thus, the first fuel injection mechanism can inject the fuel of a prescribed quantity. As a result, the fuel of a proper quantity can be supplied to the internal combustion engine.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a time chart illustrating an operation of the high-pressure pump incorporated in the fuel supply apparatus for the internal combustion engine of the first embodiment.

DESCRIPTION OF THE PREFERRED EMBODIMENTS

Hereinafter, embodiments of the fuel supply apparatus for an internal combustion engine according to the present invention will be described in detail with reference to the drawings. It is noted that the embodiments do not limit the present invention.

First Embodiment

Figure 1:
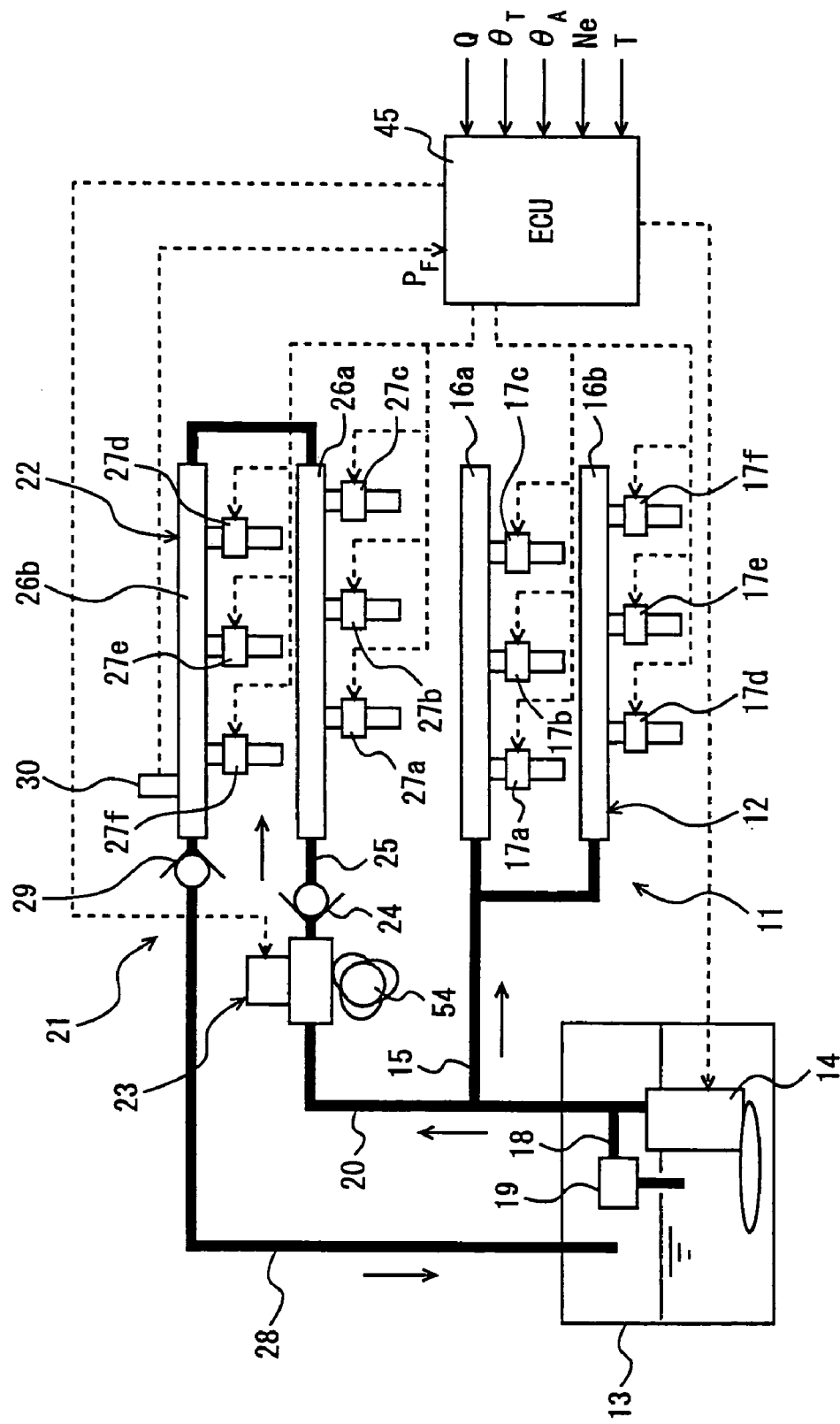
FIG. 1 is a schematic diagram showing a fuel supply apparatus for an internal combustion engine according to a first embodiment of the present invention.
Figure 2:
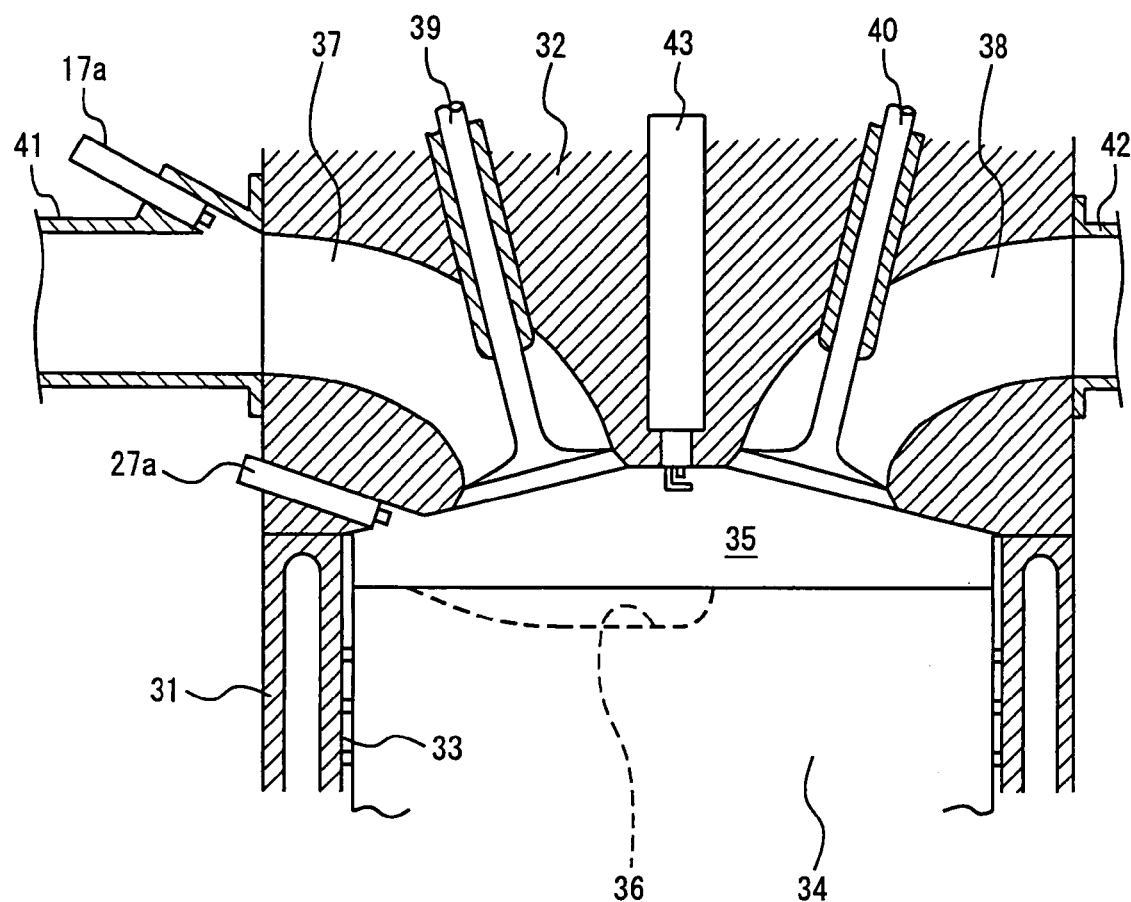
FIG. 2 is a cross sectional view of a main part of the internal combustion engine of the first embodiment.
Figure 3:
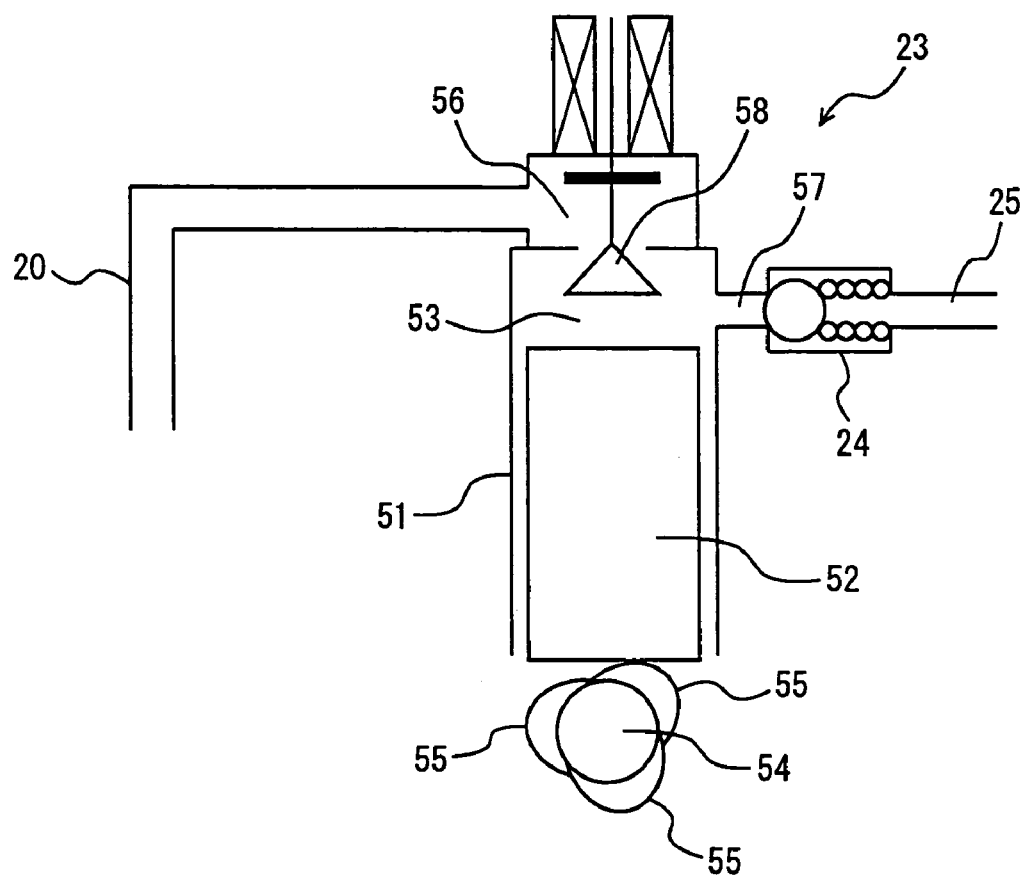
FIG. 3 is a schematic configuration diagram of a high-pressure pump incorporated in the fuel supply apparatus for the internal combustion engine of the first embodiment.
Figure 5A:
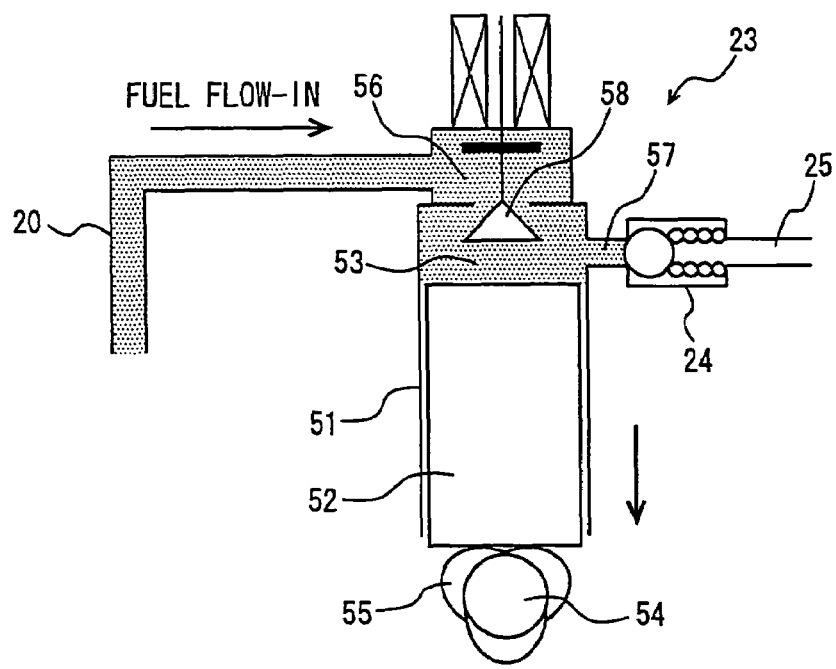
FIGS. 5A and 5B are schematic diagrams showing operating states of the high-pressure pump.
Figure 5B:
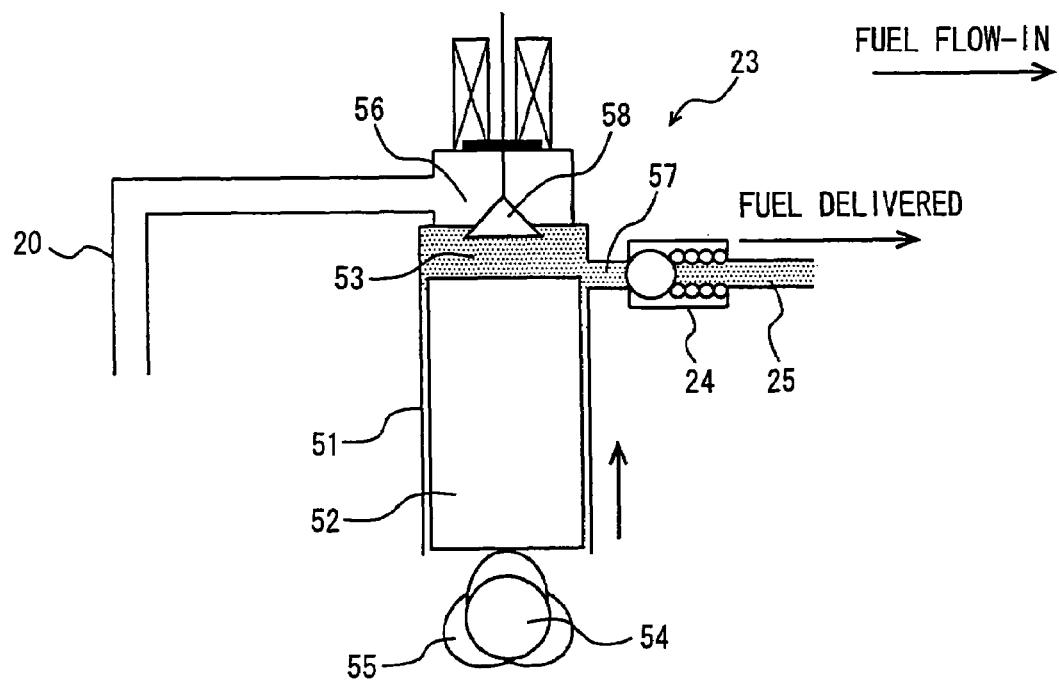
Figure 6:
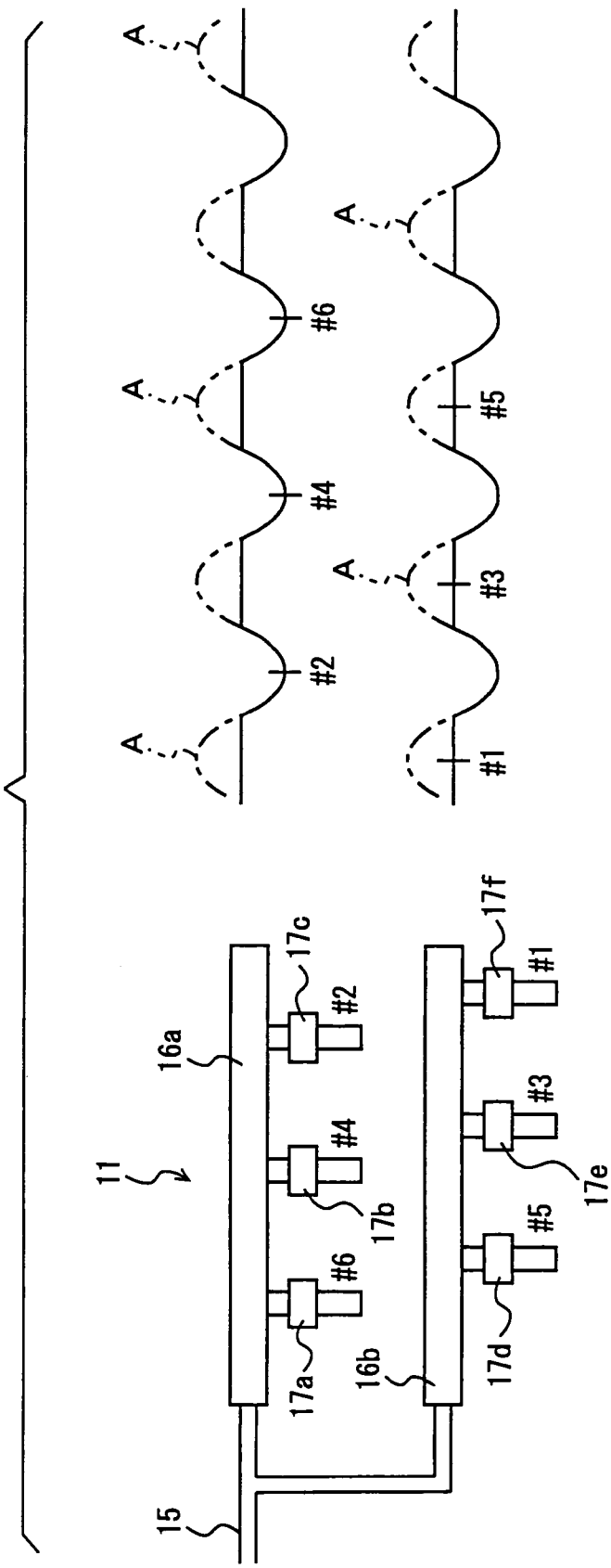
FIG. 6 is a schematic diagram showing pulsation of fuel pressure and order of ignition in a first fuel supply system.

FIG. 1 schematically shows a fuel supply apparatus for an internal combustion engine according to a first embodiment of the present invention. FIG. 2 shows a main part of the internal combustion engine of the first embodiment. FIG. 3 shows a configuration of a high-pressure pump incorporated in the fuel supply apparatus for the internal combustion engine of the first embodiment, and FIG. 4 is a time chart illustrating the operation of the high-pressure pump. FIGS. 5A and 5B schematically show operating states of the high-pressure pump. FIG. 6 schematically shows pulsation of fuel pressure and order of ignition in a first fuel supply system.

The internal combustion engine according to the first embodiment of the present invention is a V-type 6-cylinder gasoline engine. A fuel supply apparatus for this engine, as shown in FIG. 1, includes a low-pressure fuel supply system 11 serving as the first fuel supply system for transferring a low-pressure fuel, and a high-pressure fuel supply system 21 branched from low-pressure fuel supply system 11 and serving as the second fuel supply system for transferring a high-pressure fuel. Low-pressure fuel supply system 11 has a manifold fuel injection mechanism 12 serving as the first fuel injection mechanism for injecting a fuel into an intake manifold of the engine, and high-pressure fuel supply system 21 has an in-cylinder fuel injection mechanism 22 serving as the second fuel injection mechanism for directly injecting a fuel into a cylinder of the engine.

In low-pressure fuel supply system 11, a fuel tank 13 for storing the fuel is provided with a feed pump 14. Feed pump 14 is connected via a low-pressure fuel supply pipe 15 to two low-pressure fuel delivery pipes 16*a*, 16*b* arranged in parallel. Feed pump 14 is a low-pressure pump of an electric type that applies pressure to the fuel within fuel tank 13 up to a prescribed pressure (low pressure) and supplies the resultant fuel to low-pressure fuel delivery pipes 16*a*, 16*b*. Low-pressure fuel delivery pipes 16*a*, 16*b* are respectively provided with three each of manifold injectors 17*a* to 17*f* implementing the manifold fuel injection mechanism 12. A low-pressure fuel return pipe 18 is disposed to branch from a proximal end of low-pressure fuel supply pipe 15. A regulator 19 is attached to low-pressure fuel return pipe 18, which causes a part of the fuel discharged from feed pump 14 to be returned to fuel tank 13 when pressure of the fuel in low-pressure fuel supply system 11 becomes higher than a prescribed pressure, so as to maintain the pressure of the fuel in low-pressure fuel supply system 11, i.e., in low-pressure fuel delivery pipes 16a, 16b, at a constant level.

In high-pressure fuel supply system 21, a branch pipe 20 is provided which has a proximal end connected to the midstream of low-pressure fuel supply pipe 15 in low-pressure fuel supply system 11 and has a distal end connected to a high-pressure pump 23. High-pressure pump 23 is connected via a high-pressure fuel supply pipe 25 having a check valve 24 to two high-pressure fuel delivery pipes 26a, 26b arranged in parallel. High-pressure pump 23 is driven by rotation of a camshaft of the engine as will be described later in detail. High-pressure pump 23 is of a metering type, which applies pressure to the low-pressure fuel in low-pressure fuel supply system 11 (low-pressure fuel supply pipe 15) up to a prescribed pressure (high pressure), and supplies the resultant fuel to high-pressure fuel delivery pipes 26a, 26b. Check valve 24 is for maintaining the pressure of the fuel supplied to high-pressure fuel delivery pipes 26a, 26b at a constant level. Further, high-pressure fuel delivery pipes 26a, 26b are respectively provided with three each of in-cylinder injectors 27a to 27f implementing the in-cylinder fuel injection mechanism 22.

A high-pressure fuel return pipe 28 is attached to high-pressure fuel delivery pipe 26b. High-pressure fuel return pipe 28 extends to fuel tank 13, with a relief valve 29 serving as the pressure regulation valve provided midstream of the return pipe 28. With provision of relief valve 29, the pressure of the fuel supplied to high-pressure fuel delivery pipes 26a, 26b can be maintained at a constant level, and when the pressure of the fuel becomes higher than a prescribed pressure, excessive fuel can be returned to fuel tank 13. In this case, since the fuel pressure in high-pressure fuel delivery pipes 26a, 26b is dependent on the pressure with which relief valve 29 is opened, it is necessary to set this valve-opening pressure of relief valve 29 in accordance with the fuel pressure required for in-cylinder injectors 27a to 27f.

Meanwhile, the engine of the present embodiment is a V-type 6-cylinder gasoline engine, as described above, which has left and right banks formed at a prescribed angle, with three cylinders provided for each bank. Since the six cylinders have substantially the same configurations, one cylinder will now be explained representatively. As shown in FIG. 2, a cylinder head 32 is attached to the top of a cylinder block 31. A piston 34 is fitted in a cylinder bore 33 formed in cylinder block 31, in a manner movable up and down. A crankshaft (not shown) is rotatably supported at the bottom of cylinder block 31. Piston 34 is connected to the crankshaft via a connecting rod.

Cylinder block 31, cylinder head 32 and piston 34 form a combustion chamber 35. The upper portion of combustion chamber 35 (lower surface of cylinder head 33) is in the form of a pitched roof having two sloping sides that form a peak at the center. A cavity 36 of a concave shape is formed at the top surface of piston 34. At the upper portion of combustion chamber 35, i.e., at the lower surface of cylinder head 32, an intake port 37 and an exhaust port 38 are formed to face each other, and an intake valve 39 and an exhaust valve 40 have their lower ends corresponding to intake port 37 and exhaust port 38, respectively. Accordingly, when intake valve 39 and exhaust valve 40 move up and down at prescribed timings, intake port 37 and exhaust port 38 open and close, to establish connection between intake port 37 and combustion chamber 35, and between combustion chamber 35 and exhaust port 38. An intake pipe is connected to intake port 37 via an intake manifold 41, while an exhaust pipe is connected to exhaust port 38 via an exhaust manifold 42.

Intake manifold 41 implementing the intake path is provided with manifold injector 17a of manifold fuel injection mechanism 12, to allow injection of the low-pressure fuel into the intake path connected to intake port 37. Further, in-cylinder injector 27a of in-cylinder fuel injection mechanism 22 is provided at the side portion of combustion chamber 35 in the vicinity of intake port 37, to allow direct injection of the high-pressure fuel into combustion chamber 35. A spark plug 43 is provided at cylinder head 32, to be located approximately at the center of the upper portion of combustion chamber 35.

It is noted that manifold injector 17a of manifold fuel injection mechanism 12 may be provided at cylinder head 32 or a surge tank (not shown), instead of intake manifold 41, as long as it enables injection of the low-pressure fuel into the intake path. Similarly, in-cylinder injector 27a of in-cylinder fuel injection mechanism 22 may be provided at the upper portion, instead of the side portion, of combustion chamber 35, as long as it enables direct injection of the high-pressure fuel into combustion chamber 35.

In this manner, each of manifold injectors 17a to 17f of manifold fuel injection mechanism 12 is provided to a corresponding intake path of the engine, and each of in-cylinder injectors 27a to 27f of in-cylinder fuel injection mechanism 22 is provided to a corresponding combustion chamber 35. Each of manifold injectors 17a to 17f and in-cylinder injectors 27a to 27f is an electromagnetic valve, and an electronic control unit 45 serving as the control means controls fuel injection timing as well as a fuel injection quantity based on a time period during which the electromagnetic valve is electrified.

Specifically, electronic control unit (ECU) 45 determines a fuel injection quantity, injection timing, ignition timing and the like, based on the operation state of the engine such as a quantity Q of suctioned air, degree $\theta_T$ of throttle opening, degree $\theta_A$ of accelerator press-down, engine speed Ne, coolant temperature T and the like, or using a preset map, to control manifold injectors 17a to 17f and in-cylinder injectors 27a to 27f. In this case, for example, the engine speed and the engine load are used to determine whether low-pressure fuel supply system 21 is used to inject the fuel into the intake path (intake manifold) of the engine, whether high-pressure fuel supply system 21 is used to directly inject the fuel into combustion chamber 35, or whether both fuel supply systems 11, 21 are used to inject the fuel into both the intake manifold and combustion chamber 35. Further, electronic control unit 45 controls to effect or stop the operation of low-pressure pump 14, and also controls degree of opening of a metering valve of high-pressure pump 23 and the like, in accordance with the operation state of the engine as described above. High-pressure delivery pipes 26a, 26b of high-pressure fuel supply system 21 are provided with a fuel pressure sensor 30 for measuring a fuel pressure $P_F$, which outputs the result of measurement to electronic control unit 45. Electronic control unit 45 is constituted of an interface for input and output of various signals, a processing unit for calculating fuel injection timing, injection quantity and the like, and a storage unit for storing a map and the like.

In a conventional fuel supply apparatus for an internal combustion engine, high-pressure pump 23 constantly operates due to rotation of the camshaft, to suction and apply pressure to the low-pressure fuel in low-pressure fuel supply system 11. It discharges the high-pressure fuel to high-pressure fuel supply system 21 when in-cylinder fuel injection mechanism 22 is actuated. When in-cylinder fuel injection mechanism 22 is not actuated, it returns the high-pressure fuel to low-pressure fuel supply system 11. It is when the high-pressure fuel is returned that fuel pressure pulsation occurs in low-pressure fuel supply system 11, which adversely affects the fuel supply quantity of low-pressure fuel supply system 11. Thus, in the present embodiment, electronic control unit 45 causes the fuel pressurized by high-pressure pump 23 to be supplied to high-pressure fuel supply system 21, irrespective of the actuation state of in-cylinder fuel injection mechanism 22, i.e., even in the case where it is unnecessary to inject the fuel into the cylinder, and causes excessive fuel to be returned from relief valve 29 via high-pressure fuel return pipe 28 to fuel tank 13, so as to suppress occurrence of the fuel pressure pulsation in low-pressure fuel supply system 11 due to the high-pressure fuel returning operation.

Hereinafter, high-pressure pump 23 provided at high-pressure fuel supply system 21 will be described in detail. In high-pressure pump 23, as shown in FIG. 3, a plunger 52 is movably supported in a casing 51 in the form of a tube, to form a pressurizing chamber 53 for applying pressure to the fuel therein. Plunger 52 is supported and biased by a spring (not shown) in a direction to increase the size of pressurizing chamber 53. When plunger 52 is pressed by three cams 55 formed at camshaft 54, the size of pressurizing chamber 53 is decreased. At the upper portion of casing 51, a suction port 56 connected to branch pipe 20 of low-pressure fuel supply system 11 to suction the low-pressure fuel, and a discharge port 57 to discharge the pressurized fuel to high-pressure fuel supply pipe 25 of high-pressure fuel supply system 21 are formed. A metering valve 58 to open/close suction port 56 is also provided at the upper portion of casing 51. Metering valve 58 is an electromagnetic spill valve, which can close suction port 56 when electrified.

Accordingly, as shown in FIGS. 4 and 5A, at the time when camshaft 54 rotates to cause cams 55 to lower plunger 52, if suction port 56 is opened by metering valve 58, the low-pressure fuel in low-pressure fuel supply system 11 is suctioned into pressurizing chamber 53. Then, as shown in FIGS. 4 and 5B, if suction port 56 is closed by metering valve 58 at the time when camshaft 54 rotates to cause cams 55 to raise plunger 52, pressure is applied to the low-pressure fuel within pressurizing chamber 53 up to a prescribed pressure, and the pressurized fuel is delivered from discharge port 57 to high-pressure fuel supply system 21.

Hereinafter, a fuel injection method of the fuel supply apparatus for an internal combustion engine according to the present embodiment will be described. As shown in FIG. 1, electronic control unit 45 calculates a quantity Q of the fuel to be supplied to the engine, using a stored map, based on the detected engine speed Ne and degree of accelerator pressdown $\theta_A$. Electronic control unit 45 further determines whether to inject the fuel into the intake manifold of the engine, or directly into combustion chamber 35, or into both, in accordance with the operation state of the engine. Specifically, during starting warm-up of the engine, the temperature of the cylinder wall surface has not been increased sufficiently and there is a possibility that the fuel may not be atomized properly and may adhere to the wall surface, so that solely manifold fuel injection is carried out, unaccompanied by in-cylinder fuel injection. After the warm-up of the engine, the quantity of the fuel to be injected into the intake manifold and the quantity of the fuel to be injected into the cylinder are set based on the engine speed and the engine load. Normally, it is preferable to increase the quantity of the fuel injected into the intake manifold as the operation state of the engine becomes higher in rotation speed and higher in load.

When electronic control unit 45 determines from the operation state of the engine that the fuel injection region is the region where solely the manifold fuel injection is to be carried out, it provides output signals indicating injection timing and injection quantity (time period during which the valve is opened) to manifold injectors 17a to 17f of manifold fuel injection mechanism 12 to actuate manifold injectors 17a to 17f to carry out the manifold fuel injection, so as to supply the fuel satisfying a prescribed fuel supply quantity Q to the engine. Specifically, each of manifold injectors 17a to 17f of manifold fuel injection mechanism 12 firstly injects the fuel into the intake manifold only once in an early stage of intake stroke of each cylinder, as shown in FIG. 2. The injected fuel is mixed with air in intake port 37 to form an air-fuel mixture, which is introduced into combustion chamber 35 when intake valve 39 is opened. The air-fuel mixture is guided to the vicinity of spark plug 43 and ignited, so that rotation force is applied to the crankshaft.

In this case, electronic control unit 45 sets the driving duty of high-pressure pump 23 to 100%, even in the case of carrying out the manifold fuel injection using solely the manifold fuel injection mechanism 12, and supplies all the pressurized, high-pressure fuel to high-pressure delivery pipes 26a, 26b. This makes the fuel pressure in high-pressure fuel delivery pipes 26a, 26b of high-pressure fuel supply system 21 unnecessarily high. However, since high-pressure fuel delivery pipes 26a, 26b are connected to high-pressure fuel return pipe 28 having relief valve 29, when relief valve 29 is opened, excessive fuel in high-pressure fuel delivery pipes 26a, 26b is returned via high-pressure fuel return pipe 28 to fuel tank 13. Thus, the fuel pressure in high-pressure fuel delivery pipes 26a, 26b can be maintained at a prescribed level.

Further, even in the case where in-cylinder fuel injection mechanism 22 of high-pressure fuel supply system 21 is not actuated, all the high-pressure fuel in high-pressure pump 23 is delivered to high-pressure fuel supply system 21, and excessive fuel is returned via relief valve 29 and high-pressure fuel return pipe 28 to fuel tank 13. This eliminates the need to return the high-pressure fuel to low-pressure fuel supply system 11, and thus suppresses fuel pressure pulsation in low-pressure fuel supply system 11 that would occur due to the high-pressure fuel returning operation.

More specifically, as shown in FIG. 6, high-pressure pump 23 repeats suction of the low-pressure fuel and discharge of the high-pressure fuel at prescribed cycles in accordance with rotation of camshaft 54. Conventionally, when in-cylinder fuel injection mechanism 22 is not actuated, high-pressure pump 23 would discharge and return the high-pressure fuel back to low-pressure fuel supply system 11 (low-pressure fuel delivery pipes 16a, 16b), which results in occurrence of pulsation A on the positive sides of waves (as shown by dash double-dotted lines in FIG. 6) at low-pressure fuel supply system 11 upon discharge of the high-pressure fuel. Meanwhile, manifold injectors 17a to 17f inject the fuel in order from #1 to #6 at prescribed cycles. Thus, particularly in low-pressure fuel delivery pipe 16b, the injection timing may coincide with fuel pulsation A, making it difficult to inject the fuel of a desired quantity. In contrast, according to the present embodiment, high-pressure pump 23 discharges the high-pressure fuel to high-pressure fuel supply system 21 (high-pressure fuel delivery pipes 26a, 26b). This suppresses occurrence of pulsation in low-pressure fuel supply system 11, so that manifold injectors 17a to 17f can inject the fuel of a desired quantity.

If electronic control unit 45 determines based on the operation state of the engine that the fuel injection region is the region where both the manifold fuel injection and the in-cylinder fuel injection are to be carried out, it provides output signals indicating injection timing and injection quantity (time period during which the valve is opened) to manifold injectors 17a to 17f of manifold fuel injection mechanism 12 and to in-cylinder injectors 27a to 27f of in-cylinder fuel injection mechanism 22 to make them carry out the manifold fuel injection and the in-cylinder fuel injection, so as to supply the fuel satisfying a prescribed fuel supply quantity Q to the engine. Specifically, each of manifold injectors 17a to 17f of manifold fuel injection mechanism 12 firstly injects the fuel into the intake path (intake manifold) only once in an early stage of intake stroke of each cylinder, as shown in FIG. 2. The injected fuel is mixed with air in intake port 37 to form an air-fuel mixture, which is introduced into combustion chamber 35 when intake valve 39 is opened. Next, each of in-cylinder injectors 27a to 27f of in-cylinder fuel injection mechanism 22 injects the fuel into combustion chamber 35 only once in a latter stage of compression stroke of each cylinder. The injected fuel moves along the surface of cavity 36 of piston 34 and up to reach spark plug 43, and is mixed with the air-fuel mixture having been introduced into combustion chamber 35 at the time of opening of intake valve 39, to form an air-fuel mixture that can be ignited by spark plug 43. As the air-fuel mixture is ignited by spark plug 43, rotation force is applied to the crankshaft.

In the case where manifold fuel injection mechanism 12 and in-cylinder fuel injection mechanism 22 are used to carry out the manifold fuel injection and the in-cylinder fuel injection, electronic control unit 45 sets the driving duty of high-pressure pump 23 in accordance with the quantity of the fuel injected into the cylinder, that is, based on fuel pressure $P_F$ in high-pressure fuel delivery pipes 26a, 26b detected by fuel pressure sensor 30, so as to discharge the pressurized, high-pressure fuel of a prescribed quantity to high-pressure fuel delivery pipes 26a, 26b and return unnecessary high-pressure fuel back to low-pressure fuel supply system 11.

Further, if electronic control unit 45 determines based on the operation state of the engine that the fuel injection region is the region where the in-cylinder fuel injection is to be carried out, it provides output signals indicating injection timing and injection quantity (time period during which the valve is opened) to in-cylinder injectors 27a to 27f of in-cylinder fuel injection mechanism 22 to make them carry out the in-cylinder fuel injection, so as to supply the fuel satisfying a prescribed fuel supply quantity Q to the engine. Specifically, firstly, each of in-cylinder injectors 27a to 27f of in-cylinder fuel injection mechanism 22 injects the fuel into combustion chamber 35 only once in a latter stage of compression stroke of each cylinder. The injected fuel moves along the surface of cavity 36 of piston 34 and up to reach spark plug 43, where it is mixed with the air having been introduced into combustion chamber 35 in advance at the opening of intake valve 39, to form an air-fuel mixture that can be ignited by spark plug 43. When the air-fuel mixture is ignited by spark plug 43, rotation force is applied to the crankshaft.

When solely in-cylinder fuel injection mechanism 22 is used to carry out the in-cylinder fuel injection, electric control unit 45 sets the driving duty of high-pressure pump 23 in accordance with the fuel injection quantity to the cylinder, that is, based on fuel pressure $P_F$ in high-pressure fuel delivery pipes 26a, 26b detected by fuel pressure sensor 30, so as to discharge the pressurized, high-pressure fuel of a prescribed quantity to high-pressure fuel delivery pipes 26a, 26b and return unnecessary high-pressure fuel back to low-pressure fuel supply system 11. In low-pressure fuel supply system 11, however, manifold fuel injection mechanism 12 is not actuated. Thus, fuel injection control will not be adversely affected by fuel pressure pulsation in low-pressure fuel supply system 11.

As described above, according to the fuel supply apparatus for an internal combustion engine of the first embodiment, in addition to low-pressure fuel supply system 11 applying pressure to the fuel with feed pump 14 and supplying the fuel to manifold fuel injection mechanism 12 and high-pressure fuel supply system 21 branched from low-pressure fuel supply system 11 and applying pressure to the low-pressure fuel with high-pressure pump 23 of a metering delivery type driven in accordance with the operation state of the engine and supplying the resultant fuel to in-cylinder fuel injection mechanism 22, relief valve 29 for returning excessive fuel in high-pressure fuel supply system 21 is provided, and high-pressure pump 23 supplies all the pressurized fuel to high-pressure fuel supply system 21 even when in-cylinder fuel injection mechanism 22 is not actuated.

In this manner, all the high-pressure fuel having been suctioned and applied pressure by high-pressure pump 23 is delivered to high-pressure fuel supply system 21, instead of being returned to low-pressure fuel supply system 11. Thus, fuel pressure pulsation in low-pressure fuel supply system 11 caused by such a returning operation of the high-pressure fuel can be mitigated. Further, when relief valve 29 is opened, excessive fuel delivered to high-pressure fuel supply system 21 is returned via high-pressure fuel return pipe 28 to fuel tank 13. This prevents the fuel pressure in high-pressure fuel delivery pipes 26a, 26b from becoming unnecessarily high, and the fuel pressure is maintained at a prescribed level. As a result, manifold fuel injection mechanism 12 of low-pressure fuel supply system 11 can stably inject the fuel of a prescribed quantity, without being adversely affected by pulsation or fluctuation of the fuel pressure. Consequently, the fuel can be supplied to the engine in a proper quantity, so that the air-fuel ratio is stabilized, and fuel efficiency and driving properties are improved.

Further, fuel pressure pulsation of positive sides of waves affecting low-pressure fuel supply system 11 can be suppressed by only modifying the drive control method of high-pressure pump 23 by means of electronic control unit 45. No special device is required, and thus, cost increase can be prevented.

Second Embodiment

Figure 7:
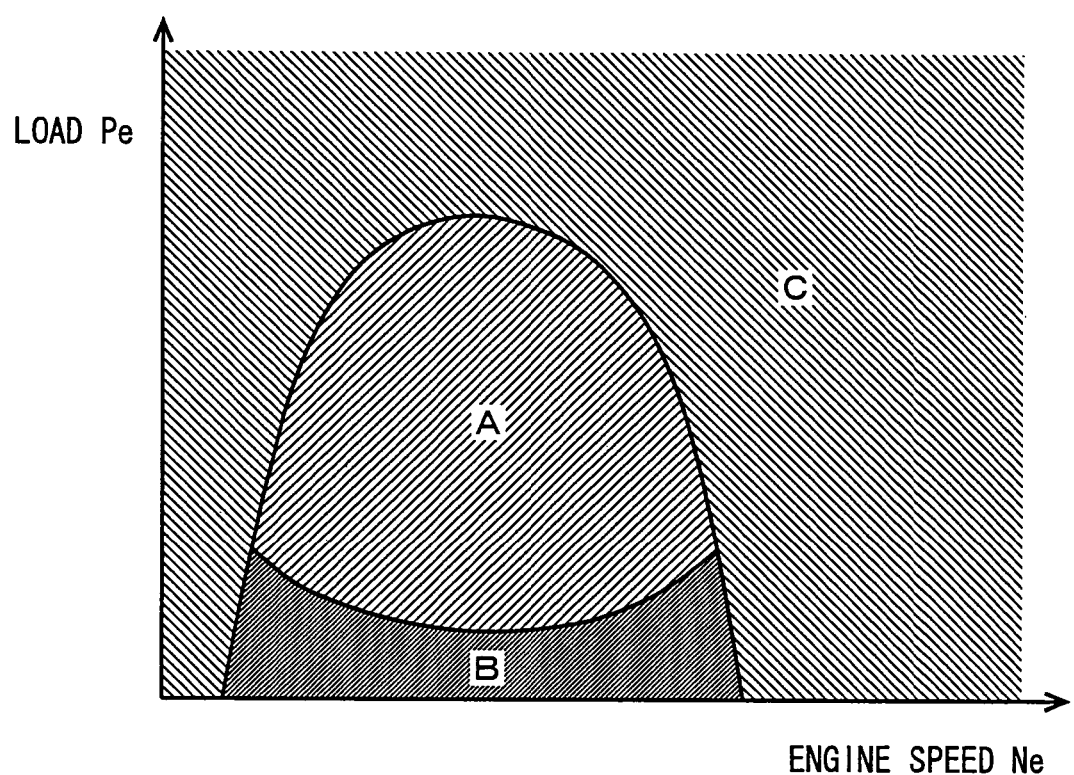
FIG. 7 is a graph showing control regions in a fuel supply apparatus for an internal combustion engine according to a second embodiment of the present invention.
Figure 8:
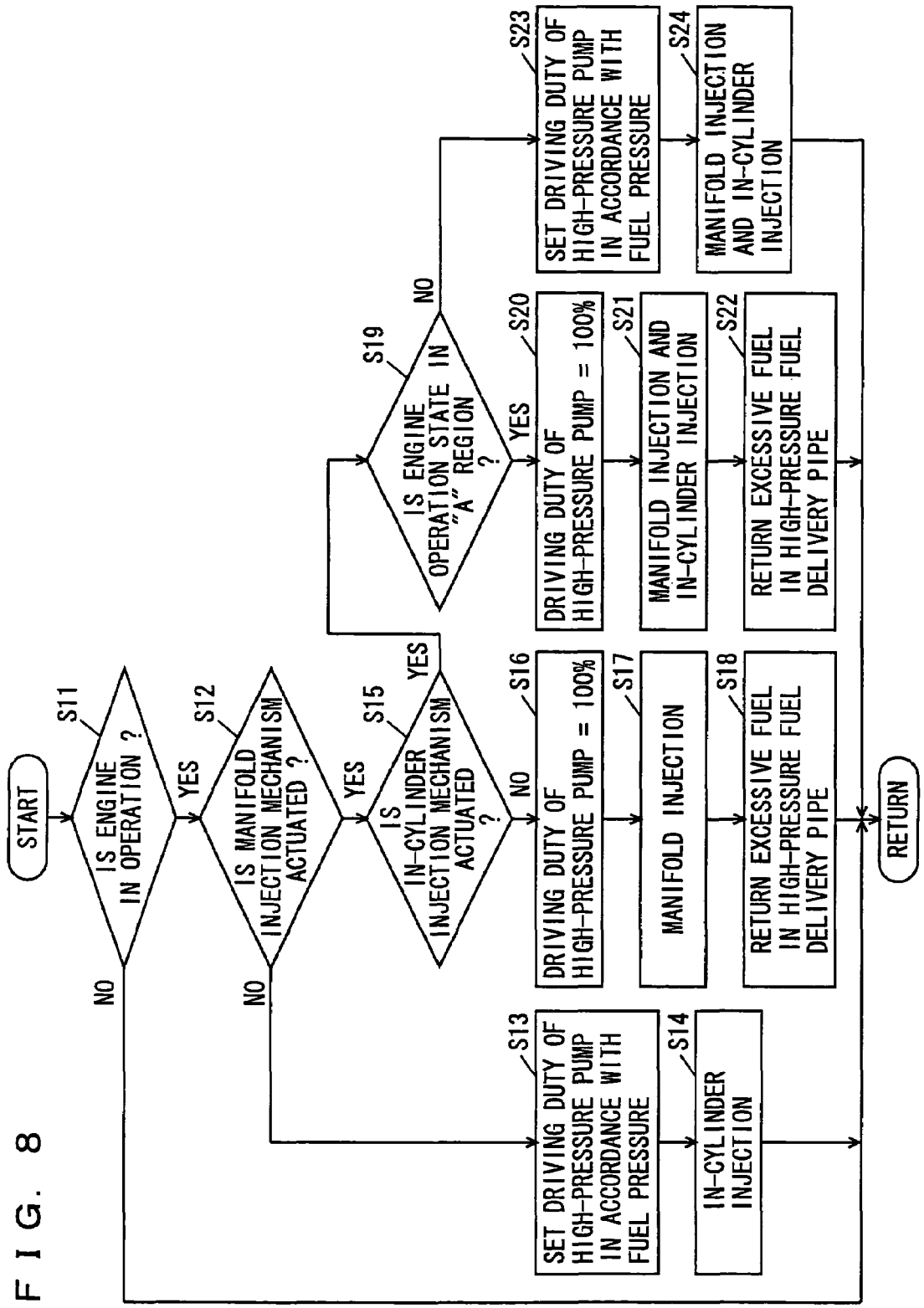
FIG. 8 is a flowchart of fuel injection control in the fuel supply apparatus for the internal combustion engine of the second embodiment.

FIG. 7 is a graph showing control regions in a fuel supply apparatus for an internal combustion engine according to a second embodiment of the present invention, and FIG. 8 is a flowchart of fuel injection control in the fuel supply apparatus of the second embodiment. The members having functions similar to those described in the previous embodiment have the same reference characters allotted, and description thereof will not be repeated.

The configuration of the fuel supply apparatus for an internal combustion engine of the second embodiment is substantially the same as that of the first embodiment. As shown in FIG. 1, it is constituted of low-pressure fuel supply system 11 for applying pressure to the fuel with feed pump 14 and supplying the fuel to manifold fuel injection mechanism 12, high-pressure fuel supply system 21 branched from low-pressure fuel supply system 11 and for applying pressure to the low-pressure fuel with high-pressure pump 23 and supplying the resultant fuel to in-cylinder fuel injection mechanism 22, and relief valve 29 for returning excessive fuel in high-pressure fuel supply system 21, of which detailed description will not be repeated.

The second embodiment is similar to the above-described first embodiment in that electronic control unit 45 controls to supply all the fuel pressurized by high-pressure pump 23 to high-pressure fuel supply system 21, even if in-cylinder fuel injection mechanism 22 is not actuated, so as to suppress occurrence of fuel pressure pulsation in low-pressure fuel supply system 11. In addition, in the second embodiment, it is configured such that, during the operation state of the engine falling within a prescribed operation region, if manifold fuel injection mechanism 12 and in-cylinder fuel injection mechanism 22 are both actuated, all the fuel pressurized by high-pressure pump 23 is supplied to high-pressure fuel supply system 21 so as to suppress occurrence of fuel pressure pulsation in low-pressure fuel supply system 11.

Specifically, the above-described control is carried out when both manifold fuel injection mechanism 12 and in-cylinder fuel injection mechanism 22 are actuated, particularly when the following two conditions are satisfied:

1. in the case where pulsation generated when high-pressure pump 23 returns the high-pressure fuel to low-pressure fuel supply system 11 will considerably adversely affect the fuel injection by manifold fuel injection mechanism 12 of low-pressure fuel supply system 11; and 2. in the case where the fuel pressure in high-pressure fuel delivery pipes 26a, 26b in high-pressure fuel supply system 21 is set in accordance with the valve-opening pressure of relief valve 29, and it will not adversely affect the injection quantity control of in-cylinder fuel injection mechanism 22.

As to the above condition 1, the fuel pressure pulsation will adversely affect the fuel injection of manifold fuel injection mechanism 12 at the time when the engine is either in the injection mode where manifold injection is solely carried out or in the injection mode where manifold injection and in-cylinder injection are both carried out with the quantity of the fuel injected into the intake manifold being equal to or greater than the quantity of the fuel injected into the cylinder. In other words, when the quantity of the fuel injected into the intake manifold is smaller than the quantity of the fuel injected into the cylinder, the pulsation generated at low-pressure fuel supply system 11 will only slightly affect the fuel injection quantity into the manifold. These injection modes correspond, e.g., to the medium speed operation region of the engine, as shown by regions A, B in FIG. 7.

As to the above condition 2, in order to maintain the injection quantity of in-cylinder injectors 27a to 27f at a proper level in high-pressure fuel supply system 21, the fuel pressure in high-pressure fuel delivery pipes 26a, 26b needs to be maintained at a prescribed value. Meanwhile, the valve-opening pressure of relief valve 29 provided in high-pressure fuel return pipe 28 is set slightly higher than the fuel pressure in high-pressure fuel delivery pipes 26a, 26b, for safety purposes. As such, when in-cylinder injectors 27a to 27f are to inject the fuel of a minimum injection quantity into the cylinder during the low load operation state of the engine, if the fuel pressure in high-pressure fuel delivery pipes 26a, 26b is set slightly higher than the valve-opening pressure of relief valve 29, i.e., the proper injection pressure, then the minimum fuel injection quantity will slightly increase, causing fluctuation of the air-fuel ratio. In other words, the fuel injection control will be adversely affected when in-cylinder fuel injection mechanism 22 is to inject the fuel of a minimum injection quantity. This corresponds, e.g., to the low load operation region of the engine, as shown by region B in FIG. 7.

Accordingly, the region satisfying the above conditions 1 and 2 corresponds to the region A shown in FIG. 7. The control of fuel injection quantity as described above is carried out when the engine is in the medium load and medium speed operation region.

Hereinafter, fuel injection control by the fuel supply apparatus for an internal combustion engine according to the present embodiment will be described with reference to a flowchart in FIG. 8.

As shown in FIG. 8, in step S11, it is determined whether the engine is in operation or not. If not, control leaves the routine, without taking any step. If it is determined in step S11 that the engine is in operation, in step S12, it is determined whether manifold fuel injection mechanism 12 is actuated or not. If not, in step S13, the driving duty of the high-pressure pump is set based on fuel pressure $P_F$ in high-pressure fuel delivery pipes 26a, 26b of high-pressure fuel supply system 21, and in step S14, in-cylinder fuel injection is carried out by in-cylinder fuel injection mechanism 22.

If it is determined in step S12 that manifold fuel injection mechanism 12 is actuated, it is then determined in step S15 whether in-cylinder fuel injection mechanism 22 is actuated or not. If not, in step S16, the driving duty of the high-pressure pump is set to 100%, and in step S17, manifold fuel injection is carried out by manifold fuel injection mechanism 12. Then, in step S18, excessive fuel in high-pressure fuel supply system 21 is returned from relief valve 29 through high-pressure fuel return pipe 28 to fuel tank 13.

In this manner, even in the case where manifold fuel injection is solely carried out, all the high-pressure fuel having been suctioned and pressurized by high-pressure pump 23 is delivered to high-pressure fuel supply system 21, instead of being returned to low-pressure fuel supply system 11. Accordingly, fuel pressure pulsation in low-pressure fuel supply system 11 caused by such a returning operation of the high-pressure fuel is suppressed. Further, excessive fuel delivered to high-pressure fuel supply system 21, which is all the fuel delivered by high-pressure pump 23 in this example, is returned via relief valve 29 to fuel tank 13. Thus, the fuel pressure in high-pressure fuel supply system 21 can be maintained at a prescribed level.

If it is determined in step S15 that in-cylinder fuel injection mechanism 22 is actuated, in step S19, it is determined whether the engine operation state is in the region A shown in FIG. 7. If the engine operation state is in region A, i.e., in the medium load and medium speed operation state, in step S20, the driving duty of the high-pressure pump is set to 100%, and in step S21, manifold fuel injection and in-cylinder fuel injection are carried out by manifold fuel injection mechanism 12 and in-cylinder fuel injection mechanism 22, respectively. Then, in step S22, excessive fuel in high-pressure fuel supply system 21 is returned from relief valve 29 through high-pressure fuel return pipe 28 to fuel tank 13.

Thus, even in the case where manifold fuel injection and in-cylinder fuel injection are carried out, all the high-pressure fuel suctioned and pressurized by high-pressure pump 23 is delivered to high-pressure fuel supply system 21, instead of being returned to low-pressure fuel supply system 11. This suppresses fuel pressure pulsation in low-pressure fuel supply system 11 that would be caused by the high-pressure fuel returning operation. Further, of the high-pressure fuel delivered to high-pressure fuel supply system 21, excessive fuel is returned via relief valve 29 back to fuel tank 13, so that the fuel pressure in high-pressure fuel supply system 21 can be maintained at a prescribed pressure.

If it is determined in step S19 that the engine operation state is not in region A (medium load and medium speed operation state), in step S23, the driving duty of the high-pressure pump is set based on fuel pressure $P_F$ of high-pressure fuel supply system 21, and in step S24, manifold fuel injection and in-cylinder fuel injection are carried out by manifold fuel injection mechanism 12 and in-cylinder fuel injection mechanism 22, respectively.

As described above, according to the fuel supply apparatus for an internal combustion engine of the second embodiment, in the state where both manifold fuel injection mechanism 12 and in-cylinder fuel injection mechanism 22 are actuated, if the engine operation state is in the medium load and medium speed region, then all the fuel quantity having been pressurized by high-pressure pump 23 is supplied to high-pressure fuel supply system 21, and excessive fuel is returned via relief valve 29 to fuel tank 13.

Accordingly, in a prescribed engine operation region, all the high-pressure fuel having been pressurized by high-pressure pump 23 is delivered to high-pressure fuel supply system 21, and there is no high-pressure fuel returned to low-pressure fuel supply system 11. This can reduce fuel pressure pulsation in low-pressure fuel supply system 11 caused by such a returning operation of the high-pressure fuel. Of the high-pressure fuel delivered to high-pressure fuel supply system 21, excessive fuel unnecessary for the in-cylinder injection is returned via relief valve 29 to fuel tank 13. Thus, the fuel pressure in high-pressure fuel delivery pipes 26*a*, 26*b* is maintained at a prescribed level, rather than becoming unnecessarily high. As a result, manifold fuel injection mechanism 12 of low-pressure fuel supply system 11 can stably inject the fuel of a prescribed quantity, without being adversely affected by pulsation or fluctuation of the fuel pressure. The fuel can be supplied to the engine in a proper quantity, and thus, the air-fuel ratio is stabilized, and fuel efficiency and driving properties are improved.

When the quantity of the fuel injected into the intake manifold is relatively small compared to the quantity of the fuel injected into the cylinder, as in the high load and high speed region of the engine, pulsation in low-pressure fuel supply system 11 will only slightly affect the fuel injection quantity into the intake manifold. In such a case, the high-pressure fuel of the quantity required for the in-cylinder injection is discharged to high-pressure fuel supply system 21, and the remaining fuel is returned to low-pressure fuel supply system 11. Thus by eliminating delivery of unnecessary fuel by high-pressure pump 23 and decreasing the drive torque of high-pressure pump 23, it is possible to reduce the load on the engine via the camshaft.

Further, when in-cylinder injectors 27*a* to 27*f* are to inject the fuel of a minimum injection quantity into the cylinder, as in the low load region of the engine, it is necessary to maintain the fuel pressure of high-pressure fuel supply system 21 with high accuracy, in order to guarantee the minimum injection quantity. In such a case, the high-pressure fuel of the quantity required for the in-cylinder injection is delivered to high-pressure fuel supply system 21, and the remaining fuel is returned to low-pressure fuel supply system 11. This enables highly accurate control of the minimum fuel injection quantity by in-cylinder fuel injection mechanism 22.

Third Embodiment

Figure 9:
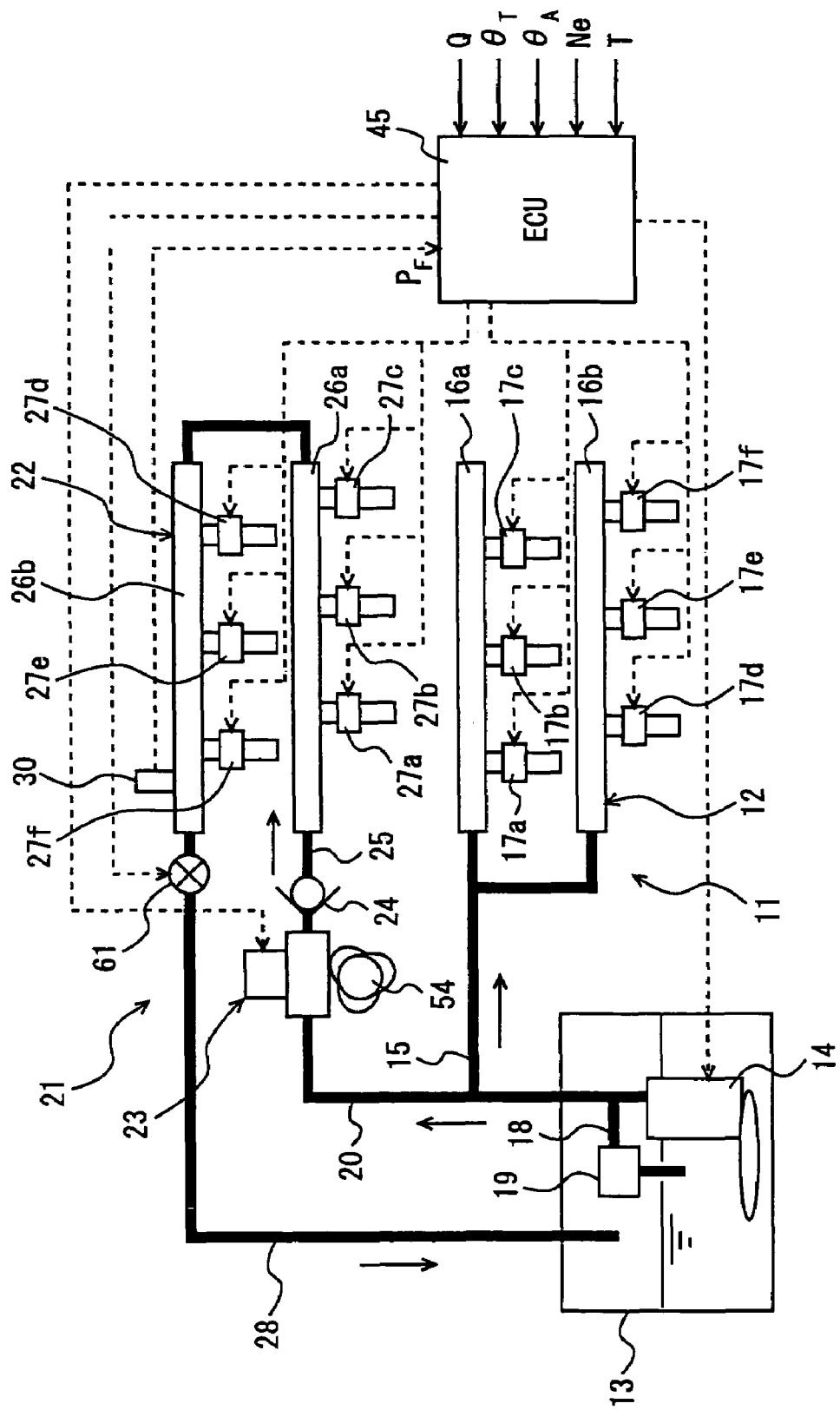
FIG. 9 is a schematic diagram showing a fuel supply apparatus for an internal combustion engine according to a third embodiment of the present invention.
Figure 10:
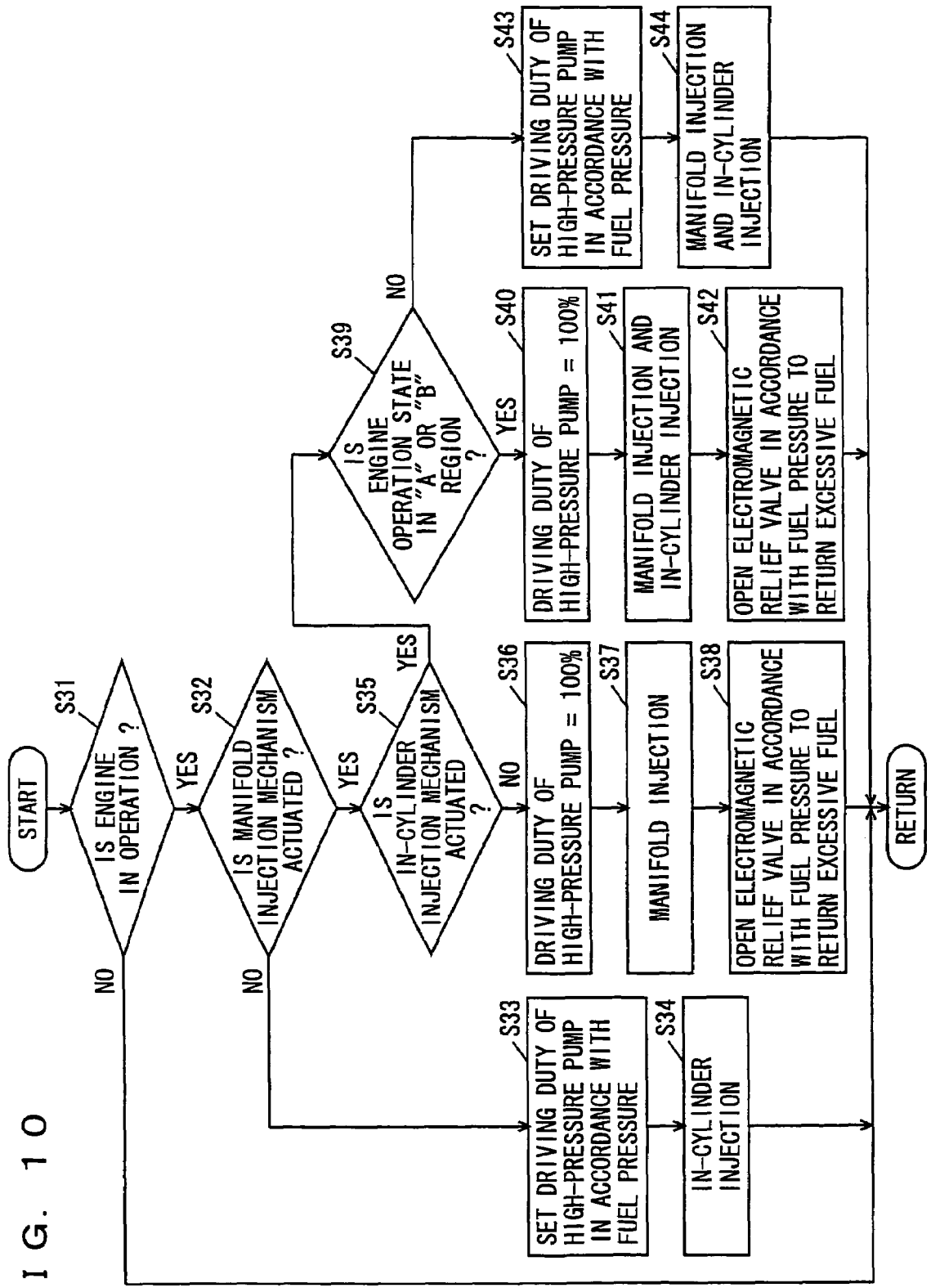
FIG. 10 is a flowchart of fuel injection control in the fuel supply apparatus for the internal combustion engine of the third embodiment.

FIG. 9 schematically shows a fuel supply apparatus for an internal combustion engine according to a third embodiment of the present invention, and FIG. 10 is a flowchart illustrating fuel injection control by the fuel supply apparatus of the third embodiment. The members having functions similar to those described in the previous embodiments have the same reference characters allocated, and description thereof will not be repeated.

The configuration of the fuel supply apparatus for an internal combustion engine according to the third embodiment is substantially the same as those of the first and second embodiments. As shown in FIG. 9, it includes low-pressure fuel supply system 11 for applying pressure to the fuel with feed pump 14 and supplying the fuel to manifold fuel injection mechanism 12, and high-pressure fuel supply system 21 branched from low-pressure fuel supply system 11 and for applying pressure to the low-pressure fuel with high-pressure pump 23 and supplying the resultant fuel to in-cylinder fuel injection mechanism 22. Then, in the present embodiment, high-pressure fuel return pipe 28 is provided with an electromagnetic relief valve 61, for returning excessive fuel in high-pressure fuel supply system 21 back to fuel tank 13.

Specifically, electronic control unit 45 controls to supply all the fuel having been pressurized by high-pressure pump 23 to high-pressure fuel supply system 21 in the case where manifold fuel injection mechanism 12 is actuated while in-cylinder fuel injection mechanism 22 is stopped, or in the case where both manifold fuel injection mechanism 12 and in-cylinder fuel injection mechanism 22 are actuated, and then controls to open/close electromagnetic relief valve 61 in accordance with the fuel pressure in high-pressure fuel supply system 21 having been supplied with the high-pressure fuel, so as to return excessive fuel in high-pressure fuel supply system 21 back to fuel tank 13.

Hereinafter, fuel injection control by the fuel supply apparatus for an internal combustion engine of the present embodiment will be described with reference to the flowchart in FIG. 10.

As shown in FIG. 10, if it is determined in step S31 that the engine is in operation and if it is determined in step S32 that manifold fuel injection mechanism 12 is not actuated, then in step S33, the driving duty of the high-pressure pump is set based on fuel pressure $P_F$ in high-pressure fuel supply system 21, and in step S34, in-cylinder fuel injection is carried out by in-cylinder fuel injection mechanism 22.

If it is determined in step S32 that manifold fuel injection mechanism 12 is actuated and if it is determined in step S35 that in-cylinder fuel injection mechanism 22 is not actuated, then in step S36, the driving duty of the high-pressure pump is set to 100%, and in step S37, manifold fuel injection is carried out by manifold fuel injection mechanism 12. Then, in step S38, open/close control of electromagnetic relief valve 61 is carried out based on fuel pressure $P_F$ in high-pressure fuel delivery pipes 26*a*, 26*b* having been detected by fuel pressure sensor 30. Specifically, in order to maintain fuel pressure $P_F$ in high-pressure fuel delivery pipes 26*a*, 26*b* of high-pressure fuel supply system 11 at a prescribed level, a time period during which electromagnetic relief valve 61 is kept open is set, and all the fuel having been delivered by high-pressure pump 23 to high-pressure fuel supply system 21 is returned as excessive fuel via high-pressure fuel return pipe 28 back to fuel tank 13.

Accordingly, the high-pressure fuel from high-pressure pump 23 is not returned to low-pressure fuel supply system 11, and thus, fuel pressure pulsation in low-pressure fuel supply system 11 caused by the returning operation of the high-pressure fuel is suppressed. Further, the excessive fuel having been delivered to high-pressure fuel supply system 21 is returned via electromagnetic relief valve 61 to fuel tank 13, so that the fuel pressure in high-pressure fuel supply system 21 is maintained at a prescribed level.

Meanwhile, if it is determined in step S35 that in-cylinder fuel injection mechanism 22 is actuated, in step S39, it is determined whether the engine operation state is in region A or B, explained in the previous embodiment in conjunction with FIG. 7. If the engine operation state is in region A (medium load and medium engine speed operation state) or in region B (low load and medium engine speed operation state), then in step S40, the driving duty of the high-pressure pump is set to 100%, and in step S41, both manifold fuel injection and in-cylinder fuel injection are carried out by manifold fuel injection mechanism 12 and in-cylinder fuel injection mechanism 22, respectively. Then, in step S42, open/close control of electromagnetic relief valve 61 is carried out such that, of the fuel having been delivered by high-pressure pump 23 to high-pressure fuel supply system 21, excessive fuel unnecessary for the in-cylinder fuel injection is returned through high-pressure fuel return pipe 28 to fuel tank 13, so as to maintain fuel pressure $P_F$ in high-pressure fuel delivery pipes 26a, 26b of high-pressure fuel supply system 21 at a prescribed level.

Accordingly, the high-pressure fuel from high-pressure pump 23 is not returned to low-pressure fuel supply system 11, and thus, fuel pressure pulsation in low-pressure fuel supply system 11 caused by the returning operation of the high-pressure fuel is suppressed. Further, of the high-pressure fuel having been delivered to high-pressure fuel supply system 21, excessive fuel is returned via electromagnetic relief valve 61 to fuel tank 13, so that the fuel pressure in high-pressure fuel supply system 21 is maintained at a prescribed level.

Further, if it is determined in step S39 that the engine operation state is not in region A or B, then in step S43, the driving duty of the high-pressure pump is set based on fuel pressure $P_F$ in high-pressure fuel supply system 21, and in step S44, both manifold fuel injection and in-cylinder fuel injection are carried out by manifold fuel injection mechanism 12 and in-cylinder fuel injection mechanism 22, respectively.

As described above, according to the fuel supply apparatus for an internal combustion engine of the third embodiment, in the state where manifold fuel injection mechanism 12 is actuated or in the state where both manifold fuel injection mechanism 12 and in-cylinder fuel injection mechanism 22 are actuated, if the operation state of the engine is in a prescribed region, then all the fuel quantity having been pressurized by high-pressure pump 23 is supplied to high-pressure fuel supply system 21, and open/close control of electromagnetic relief-valve 61 is carried out based on the fuel pressure in high-pressure fuel supply system 21 so as to return excessive fuel back to fuel tank 13.

Accordingly, in the prescribed engine operation region, all the high-pressure fuel having been pressurized by high-pressure pump 23 is delivered to high-pressure fuel supply system 21, and there is no high-pressure fuel returned to low-pressure fuel supply system 11. This can suppress fuel pressure pulsation in low-pressure fuel supply system 11 caused by such a returning operation of the high-pressure fuel. Further, of the high-pressure fuel having been delivered to high-pressure fuel supply system 21, excessive fuel is returned to fuel tank 13 via electromagnetic relief valve 61 that is controlled to open/close in accordance with the fuel pressure in high-pressure fuel supply system 21. As such, the fuel pressure of high-pressure fuel supply system 21 can readily been maintained at a prescribed level. As a result, manifold fuel injection mechanism 12 of low-pressure fuel supply system 11 can stably inject the fuel of a prescribed quantity, without being adversely affected by pulsation or fluctuation of fuel pressure. The fuel can be supplied to the engine in a proper quantity, and thus, the air-fuel ratio is stabilized and fuel efficiency and driving properties are improved.

Further, since open/close control of electromagnetic relief valve 61 ensures returning of excessive fuel back to fuel tank 13, the fuel pressure in high-pressure fuel supply system 21 can be regulated with high accuracy, so that the minimum fuel injection quantity of in-cylinder fuel injection mechanism 22 can be controlled with high accuracy as well. As a result, the control region can be expanded to regions A and B, and thus, pulsation at low-pressure fuel supply system 11 can be mitigated in a wide engine operation region.

In the above-described embodiments, in the case where solely manifold fuel injection mechanism 12 or both manifold fuel injection mechanism 12 and in-cylinder fuel injection mechanism 22 are actuated to carry out solely manifold fuel injection or both manifold fuel injection and in-cylinder fuel injection, the driving duty of the high-pressure pump is fixed to 100% and excessive fuel in high-pressure fuel supply system 21 is returned to fuel tank 13 via relief valve 29. In low-pressure fuel supply system 11, pulsation occurs depending on the quantity of the high-pressure fuel returned from high-pressure pump 23. As such, it can be considered, when an acceptable limit is set for pulsation that would not adversely affect the fuel injection quantity of manifold fuel injection mechanism 12, the high-pressure fuel may be returned from high-pressure pump 23 to low-pressure fuel supply system 11 as long as the magnitude of the resultant pulsation does not exceed the acceptable limit. For example, if the acceptable limit of pulsation corresponds to 10% of the high-pressure fuel, the driving duty of the high-pressure pump may be fixed to 90%, and 90% of the high-pressure fuel may be discharged to high-pressure fuel supply system 21 and the remaining 10% may be returned to low-pressure fuel supply system 11. In this manner, the drive torque of high-pressure pump 23 can be reduced. In other words, the value of the driving duty of the high-pressure pump may be set as appropriate in accordance with the configurations of low-pressure fuel supply system 11 and high-pressure fuel supply system 21.

Further, the fuel supply apparatus for an internal combustion engine of the present invention may be applied to any apparatus supplying a fuel to an engine serving as the internal combustion engine such as a gasoline engine and a diesel engine incorporated into a vehicle such as a passenger vehicle, a truck or the like. The engine structure is not restricted to the V-type 6-cylinder engine, but may be an in-line 4-cylinder engine, and the number of cylinders is not restricted to that of the embodiments.

As described above, the fuel supply apparatus for an internal combustion engine according to the present invention suppresses fuel pressure pulsation in the first fuel supply system by supplying the high-pressure fuel from the high-pressure pump to the second fuel supply system, irrespective of the actuation state of the second fuel injection mechanism. It is useful for the fuel supply apparatus for an internal combustion engine having a high-pressure pump that operates in accordance with the operation state of the internal combustion engine. In particular, it is suitable for reducing the influence of pulsation caused by the high-pressure pump on the quantity of the fuel being supplied to the internal combustion engine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel supply apparatus for an internal combustion engine, comprising:
   a first fuel injection mechanism injecting a fuel into an intake manifold;
   a second fuel injection mechanism injecting the fuel into a cylinder, wherein said first and second fuel injection mechanisms are provided for each cylinder of the engine;
   a first fuel supply system for applying pressure to the fuel by using a low-pressure pump and supplying the fuel to said first fuel injection mechanism;
   a second fuel supply system branched from the first fuel supply system for applying pressure to the fuel having been applied with pressure by said low-pressure pump by using a high-pressure pump of a metering delivery type driven in accordance with an operation state of the internal combustion engine and for supplying the pressurized fuel to said second fuel injection mechanism;
   control means for controlling said high-pressure pump to supply the pressurized fuel of a prescribed quantity irrespective of an actuation state of said second fuel injection mechanism; and
   a relief valve for externally discharging excessive fuel from said second fuel supply system.

2. The fuel supply apparatus for an internal combustion engine according to claim 1, wherein
   said high-pressure pump has a suction port for suctioning the fuel in said first fuel supply system, a plunger for applying pressure to the suctioned fuel, a discharge port for discharging the pressurized fuel to said second fuel injection mechanism, and a metering valve for opening/closing said suction port, and
   said control means controls opening/closing of said metering valve such that all the fuel having been suctioned through said suction port is discharged through said discharge port.

3. The fuel supply apparatus for an internal combustion engine according to claim 1, wherein said relief valve is a pressure regulation valve that is opened when a fuel pressure in said second fuel supply system is greater than an injection pressure of said second fuel injection mechanism to externally discharge excessive fuel in said second fuel supply system.

4. The fuel supply apparatus for an internal combustion engine according to claim 1, wherein
   said high pressure pump comprises:
      a suction port that suctions the fuel of said first fuel supply system;
      a plunger that pressurizes the suctioned fuel;
      a discharge port that discharges the pressurized fuel toward said second fuel injection mechanism; and
      a metering valve that opens and closes said suction port, and
   said control means controls said high-pressure pump to supply the pressurized fuel of a prescribed quantity irrespective of an actuation state of said second fuel injection mechanism in a specific operation region of said internal combustion engine, and controls timing of the opening and closing of said metering valve to supply the pressurized fuel of a quantity in accordance with the actuation state of said second fuel injection mechanism in another operation region.

5. The fuel supply apparatus for an internal combustion engine according to claim 4, wherein the specific operation region of said internal combustion engine is a medium engine speed and medium load operation region.

6. The fuel supply apparatus for an internal combustion engine according to claim 1, wherein
   said relief valve is an electromagnetic relief valve, and
   said control means controls opening/closing of said electromagnetic relief valve such that the fuel pressure in said second fuel supply system is maintained at a preset level.

7. The fuel supply apparatus for an internal combustion engine according to claim 6, wherein a supply quantity of the pressurized fuel by said high-pressure pump is fixed to a preset value when said first and second fuel injection mechanisms are actuated.

8. A fuel supply apparatus for an internal combustion engine, comprising:
   a first fuel injection mechanism injecting a fuel into an intake manifold;
   a second fuel injection mechanism injecting the fuel into a cylinder, wherein said first and second fuel injection mechanisms are provided for each cylinder of the engine;
   a first fuel supply system for applying pressure to the fuel by using a low-pressure pump and supplying the fuel to said first fuel injection mechanism;
   a second fuel supply system branched from the first fuel supply system for applying pressure to the fuel having been applied with pressure by said low-pressure pump by using a high-pressure pump of a metering delivery type driven in accordance with an operation state of the internal combustion engine and for supplying the pressurized fuel to said second fuel injection mechanism;
   a control unit for controlling said high-pressure pump to supply the pressurized fuel of a prescribed quantity irrespective of an actuation state of said second fuel injection mechanism; and
   a relief valve for externally discharging excessive fuel from said second fuel supply system.

9. The fuel supply apparatus for an internal combustion engine according to claim 8, wherein
   said high-pressure pump has a suction port for suctioning the fuel in said first fuel supply system, a plunger for applying pressure to the suctioned fuel, a discharge port for discharging the pressurized fuel to said second fuel injection mechanism, and a metering valve for opening/closing said suction port, and
   said control unit controls opening/closing of said metering valve such that all the fuel having been suctioned through said suction port is discharged through said discharge port.

10. The fuel supply apparatus for an internal combustion engine according to claim 8, wherein said relief valve is a pressure regulation valve that is opened when a fuel pressure in said second fuel supply system is greater than an injection pressure of said second fuel injection mechanism to externally discharge excessive fuel in said second fuel supply system.

11. The fuel supply apparatus for an internal combustion engine according to claim 8, wherein
said high pressure pump comprises:
a suction port that suctions the fuel of said first fuel supply system;
a plunger that pressurizes the suctioned fuel;
a discharge port that discharges the pressurized fuel toward said second fuel injection mechanism; and
a metering valve that opens and closes said suction port, and
said control unit controls said high-pressure pump to supply the pressurized fuel of a prescribed quantity irrespective of an actuation state of said second fuel injection mechanism in a specific operation region of said internal combustion engine, and controls timing of the opening and closing of said metering valve to supply the pressurized fuel of a quantity in accordance with the actuation state of said second fuel injection mechanism in another operation region.

12. The fuel supply apparatus for an internal combustion engine according to claim 11, wherein the specific operation region of said internal combustion engine is a medium engine speed and medium load operation region.

13. The fuel supply apparatus for an internal combustion engine according to claim 8, wherein
said relief valve is an electromagnetic relief valve, and
said control unit controls opening/closing of said electromagnetic relief valve such that the fuel pressure in said second fuel supply system is maintained at a preset level.

14. The fuel supply apparatus for an internal combustion engine according to claim 13, wherein a supply quantity of the pressurized fuel by said high-pressure pump is fixed to a preset value when said first and second fuel injection mechanisms are actuated.

* * * * *